(No Model.)
W. W. LE GRANDE.
GALVANIC BATTERY.
No. 346,207. Patented July 27, 1886.
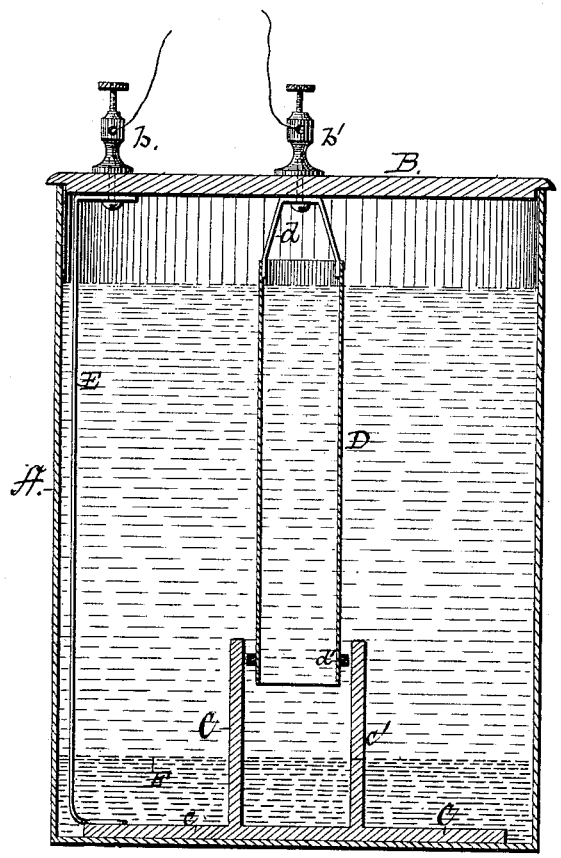
WITNESSES
F. L. Ourand
A. G. Heylmun
INVENTOR
W. W. LeGrande,
by J. M. Yznaga,
Attorney

United States Patent Office.

WILLIAM W. LE GRANDE, OF LOUISVILLE, KENTUCKY, ASSIGNOR OF ELEVEN TWENTY-FOURTHS TO H. R. DERING, W. W. DERING, AND T. H. UPPERMAN, ALL OF SAME PLACE.

GALVANIC BATTERY.

SPECIFICATION forming part of Letters Patent No. 346,207, dated July 27, 1886.

Application filed October 28, 1885. Serial No. 181,135. (No model.)

*To all whom it may concern:*

Be it known that I, WILLIAM W. LE GRANDE, a citizen of the United States of America, residing at Louisville, in the county of Jefferson and State of Kentucky, have invented certain new and useful Improvements in Galvanic Batteries; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention has relation to improvements in galvanic batteries; and the objects are, first, to provide a galvanic battery especially adapted for use in railway signaling apparatus, and under conditions where it is desirable to have a battery that will give a uniform and constant current at little cost of maintenance for a great length of time; second, to provide a battery which will reduce the consumption of generative elements to the minimum, and, third, to provide a battery wherein the mechanical elements in their relation to the chemical elements are arranged to reduce the internal resistance to the minimum and increase the electro-motive force to the maximum.

Heretofore galvanic batteries used to effect these objects were composed in part of two fluid elements, separated or kept one above the other by their difference in density. Such batteries have proved generally deficient, particularly for railway electro-mechanical signal apparatus, principally because the constant and rapid evaporation of the upper and lighter elements throws the two quantities out of proportion and renders the functions of the battery fleeting, varying, and unreliable. Again, by the constant and extensive deposition of salts, sulphides, and sulphates, the battery is liable to be short-circuited, polarized, or endowed with opposite properties in opposite or contrasted points. I have sought in the arrangement and construction of my improved galvanic battery to overcome these objectionable elements and functional deficiencies; and to this end my invention consists in the combination and arrangement of elements hereinafter more fully described, and as specifically pointed out in the claims.

I have fully illustrated my improved galvanic battery in the accompanying drawing, wherein is shown a vertical central sectional view of the battery with all its parts and adjuncts; and, reference being had thereto—

The letter A designates the glass battery-jar, which may be of the usual construction and dimensions. To the top of the jar is fitted a porcelain cap, B, provided with terminal posts $b$ $b'$, having line-apertures and set-screws, as usual.

The letter C designates the zinc element, consisting of a broad flat base, $c$, made to nearly fill the superficial extent of the bottom of the jar, and having a central tubular cup, $c'$, cast integral with the base, and of such height as to project for a distance above the mercury when seated in position.

The letter D designates a platinized silver tube, of less diameter than the interior diameter of the zinc cup $c'$, and having attached to its upper end the metal yoke $d$, which in turn is mechanically connected or attached to the terminal post $b'$ by means of a screw projected through the neck of the yoke and porcelain cap, substantially as shown. The platinized silver tube D is of such length as that when arranged in position the lower end will project into the zinc cup for a distance and short of the mercury, as shown, and about the lower end of the tube, on the part projecting into the zinc cup, is fitted a gutta-percha insulating-ring, $d'$, the purpose of which is to obtain ready and correct adjustment of the parts, and to prevent metallic contact of the tube and cup. The ring $d'$ is made somewhat smaller than the zinc cup, in order to permit circulation and access of the acid solution in the cup. The tube D is composed of pure silver, free from alloy, rolled thin, and made into a tube. It is then platinized or coated with a heavy deposit of bichloride of platinum, the object of which is to prevent the free hydrogen in its upward movement from sticking to the surface of the tube.

The letter E designates a copper wire, having its upper end attached to the terminal post $b$ and its lower end bent to lie horizontally and set on the base of the zinc plate or cup-base. This wire is covered with gutta-percha, except in that part contacting with the zinc base, and forms the conductor for the return of the current.

In the bottom of the jar, over the zinc base, is deposited a quantity of mercury, (marked F.) This is supplied in sufficient quantity to fill the jar to a distance up the sides of the zinc cup, and the interior of the cup is also filled with mercury to the same height as that surrounding it exteriorly. In ordinary-sized jars about two pounds of mercury are placed. After the mercury has been deposited in the jar, I then fill the jar to within one inch of the top with a solution of sulphuric acid composed of eighteen parts of water and one part of sulphuric acid, and then arrange the cap on the jar, with the depending platinized silver tube and conducting-wire disposed as seen in the drawing.

The action of this battery is as follows: The mercury amalgamates the zinc, which is partially submerged therein, and constitutes a generating-electrode, that will consume or give off its solid element gradually.

It will be seen that the platinized silver tube is arranged with its lower end extended below the upper edge of the zinc cup. The two elements are thus brought close to each other, thereby reducing the internal resistance to the minimum. It will also be seen that with this combination the acid solution and zinc are the only elements that are consumed in the action of the battery.

What I claim as my invention, and desire to secure by Letters Patent, is—

1. The combination, with jar A, having the cap B, and containing mercury and diluted sulphuric acid, and the insulated conductor E, of the zinc element C, having extended flat base $c$ and central tube or cup, $c'$, sunk in the mercury, with the central tube or cup, $c'$, projecting into the acid solution, and the platinized silver tube D, having metallic connection with the cap B, and projected for a distance short of the mercury into the tubular cup $c'$, substantially as described.

2. The combination, with the jar A, having the cap B, and containing mercury and diluted sulphuric acid, and the insulated conductor E, of the zinc element C, having extended flat base $c$ and central tubular cup, $c'$, sunk in the mercury, with the tubular cup projecting into the acid solution, the platinized silver tube D, having metallic connection with the cap B, and projected for a distance short of the mercury into the tubular cup $c'$, and the insulating-ring $d'$, separating the platinized silver tube and the zinc tube, substantially as and for the purpose stated.

3. In a galvanic battery, the combination of a positive electrode having a flat base and a central tubular receptacle projecting therefrom, a tubular negative electrode fixed in suspension to the top of the jar and extended partially within the tube of the positive electrode, an amalgamating element on the base about the tube and within it, and an acid solution, substantially as described.

In testimony whereof I affix my signature in presence of two witnesses.

WILLIAM W. LE GRANDE.

Witnesses:
A. G. HEYLMAN,
E. T. PRITCHARD.